United States Patent
Dubois

(10) Patent No.: US 6,193,913 B1
(45) Date of Patent: Feb. 27, 2001

(54) PROCESS FOR MARKING AN ARTICLE PRODUCED BY EXTRUSION-BLOW MOLDING

(75) Inventor: Eric Dubois, Hannut (BE)

(73) Assignee: Solvay S.A. (Societe Anonyme), Brussels (BE)

( * ) Notice: Subject to any disclaimer, the term of this patent is extended or adjusted under 35 U.S.C. 154(b) by 0 days.

(21) Appl. No.: 09/119,228

(22) Filed: Jul. 21, 1998

(30) Foreign Application Priority Data

Jul. 21, 1997 (FR) .................................................. 97 09336

(51) Int. Cl.$^7$ .............................. C09D 11/00; G01B 1/00
(52) U.S. Cl. ...................... 264/40.1; 264/40.4; 264/540; 264/541; 264/21; 106/31.15
(58) Field of Search .................................. 264/540, 541, 264/40.1, 40.4, 21; 106/31.15

(56) References Cited

U.S. PATENT DOCUMENTS

| | | | |
|---|---|---|---|
| 3,466,704 | 9/1969 | Fogelberg et al. . | |
| 5,071,993 | * 12/1991 | Leppard | 548/220 |
| 5,102,588 | * 4/1992 | Feuerherm | 264/541 |
| 5,256,346 | * 10/1993 | Feuerherm | 264/541 |
| 5,718,852 | * 2/1998 | Campbell et al. | 264/541 |
| 5,755,860 | * 5/1998 | Zhu | 106/31.15 |
| 5,772,750 | * 6/1998 | Tomiya et al. | 106/413 |
| 5,852,076 | * 12/1998 | Serafin et al. | 523/315 |
| 5,914,209 | * 6/1999 | Grushkin | 430/106.6 |
| 5,928,581 | * 7/1999 | Dinkel et al. | 264/541 |

FOREIGN PATENT DOCUMENTS

| | | |
|---|---|---|
| 56028830 | 3/1981 | (EP) . |
| 58042437 | 3/1983 | (EP) . |
| 07256780 | 10/1995 | (EP) . |
| 2178361 | 2/1987 | (GB) . |
| 2-219871 | * 9/1990 | (JP) . |

* cited by examiner

*Primary Examiner*—Jan H. Silbaugh
*Assistant Examiner*—Suzanne E McDowell
(74) *Attorney, Agent, or Firm*—Venable; Marina V. Schneller

(57) ABSTRACT

Process for marking a thermoplastic article produced by extrusion of a parison and blow moulding of the said parison, in which the extruded parison is marked before blow moulding by at least one jet of an ink based on a compound which crystallizes in acicular form during drying. No figure.

9 Claims, No Drawings

PROCESS FOR MARKING AN ARTICLE PRODUCED BY EXTRUSION-BLOW MOLDING

The present invention relates to a process for marking a thermoplastic article produced by extrusion-blow moulding, as well as to a procedure for checking the production of such an article by extrusion-blow moulding.

The production of thermoplastic articles by extrusion-blow moulding is widely known and developed on an industrial scale. At the present time, it applies especially to the production of hollow bodies, such as bottles or containers, which have complex shapes and must meet increasingly demanding specific criteria. Thus, in the particular case of fuel tanks, voluminous hollow bodies, which have complex shapes dictated by the precise location for which they are intended and a non-uniform thickness, but which must also meet precise requirements especially in terms of mechanical strength and impermeability, are produced by extrusion-blow moulding.

Before blow moulding, an extruded parison may be shaped at several points and in several directions by quite complex tooling so as to adapt it already to the profile of the article which has to be produced.

Before the mould is closed, the parison may also be preblown, which runs the risk of part of this parison being forced out of the mould upon closing it (lateral flash).

Finally, due to the variation in the rheological behaviour of thermoplastics, the parison may also be longitudinally shifted and its working part displaced (in the longitudinal flash) with respect to the mould during blow moulding.

In view of these aspects, it currently proves to be essential to ensure that the parison is optimally positioned, longitudinally and azimuthally, before it is blow moulded, to be able to check this positioning and, where necessary, to be able to modify it, at least for the subsequent production cycles.

One possible checking method consists in weighing the as-produced article, the various types of flash and the deflashed article. However, such checking provides only an overall picture of the process and does not allow precise analysis of the results or, consequently, a specific intervention to be made based on the causes of the disturbance.

According to document GB-A-2,178,361, it is known to affix, to an extruded parison of longitudinally variable thickness, before blow moulding, marks uniformly space along the length by the movement of a marker and by its contact with the parison. After blow moulding, the thickness of the article produced is measured at the affixed marks, the results are compared with the desired values and, if required, it is possible, as a consequence, to rectroact on certain operating parameters for the purpose of the following cycles.

However, in industrial production, this process proves in fact to be very difficult, if not impossible, to implement, in particular in that keeping the markers in a high-temperature environment, moving them every cycle and bringing them into uniform contact with the parison extruded in the molten state very rapidly renders them unusable.

Furthermore, moving the markers and contacting them with the parison, as described, are poorly suited to marking, in a large number of separate positions, voluminous hollow bodies of complex shapes produced by extrusion-blow moulding.

Consequently, the object of the present invention is to allow marking in a manner which is simple, reliable and suited to the industrial conditions of the production of thermoplastic articles by extrusion-blow moulding.

For this purpose, the invention relates to a process for marking a thermoplastic article produced by the extrusion of a parison and blow moulding of the said parison, in which the extruded parison is marked before blow moulding by at least one jet of an ink based on a compound which crystallizes in acicular form during drying.

By implementing the marking process according to the invention, it has been possible to observe that, even in an industrial environment, at high temperatures near the extrusion head and the parison, not only is the marking of the parison always of excellent quality but that the marking device and, in particular, the ink remain operational both in long periods of continuous use and after long periods during which the production has stopped.

Furthermore, it has been advantageously observed in the case of marking according to the invention using injectors that it was no longer required to move these injectors so that they are taken away from the parison when they are not in operation so as to prevent them being closed off by the ink drying. This is because, even in the case of partial drying of the ink in the injector, due in particular to the surrounding temperature, the shape of the crystals allows them to be ejected for the purpose of marking the article.

The ink-jet marking may be carried out in any known manner. Ink-jet is understood to mean here the sending, without substantial dispersion, of a predetermined quantity of ink (m) over a defined distance (d) and with a high and reproducible velocity (v). Beneficial results have been obtained when the d/v ratio i.e. the duration of the movement of the ink, does not exceed 5 milliseconds. The distance d is varied depending on the specific application of the process. Preferably, it does not exceed 30 cm. In particular, the injectors are opened and closed by the movement of a needle in the injector. For dosing the ink, solenoid valves having a short response time, particularly of the order of $10^{-3}$ s, have advantageously been used. In general, the ink jet or jets is or are controlled by an interface adapted by those skilled in the art to the specific constraints of each production. Advantageously, this interface comprises an electronic unit which receives information coming, especially, from the extrusion-blow moulding device and generating pulses which produce the appropriate ink jet or jets. Preferably, the pulse time is of the order of a millisecond, more preferably still about 1 millisecond. Matrix control of the electronic unit has given excellent results, in particular using a matrix having up to 64 segments which can represent up to 64 opening or closing positions of each injector per production cycle, and therefore up to 64 marks per injector at different positions on the parison. Useful results have been obtained with a pressure in the ink circuit not exceeding 3.5 bar. Moreover, this pressure in the ink circuit is advantageously at least 0.7 bar.

The invention may be implemented in the use of one or more injectors. Advantageously, it allows the use of several injectors. The marking may thus be readily carried out at various azimuthal and/or longitudinal positions on the parison. Particularly useful results have been obtained with the use of a large number of injectors, especially up to 24 injectors. In the particular case of a marking device comprising 24 injectors, which is combined with 64-segment matrix control, it is therefore possible to affix up to 64×24 marks, i.e. 1536 marks, to the parison.

Each injector may be stationary or can move during each production cycle. Useful results have been obtained when each injector is stationary.

The ink is employed in any manner known by those skilled in the art and adapted, in particular, to the production in question. It has been observed that, for marking a parison, a solution based on a chlorinated solvent proved to be particularly advantageous. These chlorine-based solvents are first of all widely available and well accepted in an industrial environment for the application in question. Furthermore, they have the advantage of rapidly evaporating at the temperatures to which they are subjected when marking the parison. Thus, they allow the ink to dry rapidly, prevent the blowing mould from being marked by the parison and prevent any undesirable marking of the parison which is introduced during the next cycle. Finally, their diffusion within certain thermoplastics, such as especially polyolefins, in the molten state promotes attachment of the ink to these thermoplastics. Advantageously, the ink is consequently employed according to the invention in solution with a chlorine-based solvent. Among chlorine-based solvents, trichloroethane, carbon tetrachloride, chlorobenzene and tetrahydrofuran have given good results. Excellent results have been obtained with trichloroethane.

The ink adopted may be of any known type. In particular, it will be adapted to the thermoplastic to which it has to be attached. Advantageously, it is a fluorescent ink. This fluorescence characteristic ensures that the marks on the article are visible while using a minimum amount of ink; this proves to be economical and further reduces the risk of the ink drying in the marking device and of blocking the latter. In particular, the fluorescent ink adopted is not visible to the naked eye when it is exposed to radiation within a specific wavelength range. Thus, discreet marking of the articles may be achieved, which is not directly visible by possible intermediaries who will use the article and which does not permanently alter the appearance with regard to the end user.

Excellent results have been obtained when the compound which crystallizes in acicular form during drying is 2,5-bis (5'-tert-butyl-2'-benzoxazolyl)thiophene.

By means of the process according to the invention, the extruded parison may be marked at one or more separate positions. Advantageously, the extruded parison is marked at several separate positions, in particular at various azimuthal and/or longitudinal positions. Due to the simplicity and reliability of the process, it is possible in particular to mark the extruded parison at certain precise positions which must correspond to critical parts of the article after blow moulding (thicker regions or parts thinned by greater stretching, parts which have tighter tolerances for subsequent assembly, parts which will be particularly stressed during use of the article, etc.).

The marking may furthermore comprise information (producer, date, production site, composition, etc.), in directly legible form or in indirectly legible form (bar code etc.) which allows precise identification of the article throughout its life and even, if necessary, for the purpose of recycling it. Finally, the marking may include a local parison preparation treatment for the purpose of subsequently affixing any means of identification to the article produced.

During extrusion-blow moulding, it is known in particular to shape the parison by one or more tools (VWDS-WBK, PWDS, SFDR, etc., as well known to manufacturers of extrusion-blow moulding devices) at a fixed number of points where they can modify, in particular, the thickness and/or the shape of the parison according to a predetermined profile before blow moulding. The process according to the invention applies advantageously to an extruded parison which is shaped at at least one point before being marked at this point. This is because such marking of the parison makes it possible, especially after blow moulding the article, to check whether the points where the parison has been shaped actually correspond to the desired parts of the article and, if necessary, to retroact and consequently to modify certain operating parameters.

Thus, as has already been mentioned, the marking process may be applied to the production of very many articles of any shape or volume by extrusion-blow moulding, such as, especially bottles, containers and nozzles associated therewith. It is particularly suitable in the case where the article is a container and even more particularly in the case where the article is a fuel tank. Advantageously, it also applies to a fuel supply nozzle.

The process according to the invention is applicable to a parison of constant or non-constant thickness. Advantageously, it is employed on a parison of non-constant thickness. This is because, as was explained above, the process especially makes it possible to identify, by marking, certain critical parts of the parison of particular thickness and subsequently to check their actual position on the article produced.

The thermoplastic may consist of one or more polymers. The polymers may be homopolymers, copolymers or blends thereof. By way of such polymers, polyolefins or vinyl chloride polymers may, for example, be used. Good results have been obtained using a polyolefin, in particular using a polypropylene or a polyethylene, preferably using a polyethylene. Excellent results have been obtained using a high-density polyethylene (HDPE).

One or more usual additives such as, especially, antioxidants, antacids, stabilizers or pigments, may obviously be added to the thermoplastic.

The article may essentially consist of a single thermoplastic or of several thermoplastics. In particular, it may be a multilayer article.

Very useful results have been obtained when the parison is, at least with regard to the marking surface, based on a polyolefin and, more particularly, when at least the surface layer on which the marking is formed is based on a polyolefin.

The marking may be formed on the external or internal surface of the article. Often, for the convenience of forming and of subsequently reading the marking, it is formed on the external surface of the article.

The marking is in no way incompatible with any possible surface treatment of the article after blow moulding such as, in particular, a surface impermeabilization treatment. This surface treatment may be carried out on an unmarked surface of the article, or the ink employed may be chosen so as to be compatible with the surface treatment.

The process according to the present invention allows an article to be marked for the purpose of checking, in particular, the position of the parison in the blowing mould by examining the final position of the marks on the article with respect to the position where they were formed on the parison. The process also provides, by means of the final deformation of the marks, a beneficial indication as to the direction and amplitude of the stretching to which the marked point was subjected during blow moulding.

Consequently, the subject of the present invention is also a procedure for checking the production of thermoplastic articles by extrusion-blow moulding, comprising a marking process, as described above, a step of checking the actual position of the marking on the article produced, a comparison of this actual position with a predefined reference position and, consequently, a modification of certain operating parameters for the following production cycles.

For the various definitions relating to this aspect of the invention, reference may be made in particular to the previously defined common concepts.

With regard to checking the actual position of the marking on the article produced, this may be carried out by any known means. In the particular case of the use of a fluorescent ink, it will be carried out by exposing the article to light radiation of suitable wavelength. This check may be made by the intervention of an operator or automatically. Preferably, it is carried out automatically.

The actual position of the marking may also be compared with a predefined reference position using any known means. This comparison may be made by the intervention of an operator or automatically. Preferably, it is carried out automatically. Advantageously, the results of this comparison are recorded so as to allow optionally integrated processing of the results and to reveal possible changes over time.

As a consequence of this comparison, certain operating parameters may be modified for the following production cycles. The modification may concern many operating parameters such as, in a non-limiting manner, the extrusion parameters (temperatures, rates, etc.) and the operating times (start, duration and end of extrusion, of marking, of possible preblowing, of blow moulding, etc.). This modification may be introduced on the basis of the results corresponding to the last article produced or in an integrated manner on the basis of the results corresponding to a defined number of cycles. Preferably, the modification is introduced on the basis of the results corresponding to several cycles so as to smooth out the results obtained and to reduce the effect of one result which might be manifestly erroneous. The parameter modification may be carried out by the intervention of an operator or automatically. Preferably, it is carried out automatically.

It is particularly preferred to check the actual position of the marking on the article produced, to compare this actual position with a predefined reference position and consequently to modify certain operating parameters for the following production cycles automatically.

The production checking procedure according to the invention may be advantageously combined or integrated with a broader checking procedure or system which integrates and retroacts on other operating parameters.

The invention is illustrated in a non-limiting manner by the following example.

EXAMPLE

A coextruded parison comprising 6 layers, having a virgin HDPE/reground HDPE/MAgPE/EVOH/MAgPE/virgin HDPE structure (virgin HDPE on the surface=ELTEX® K4606 from SOLVAY, MAgPE=maleic-anhydride-grafted polyethylene, EVOH=partially hydrolysed ethylene-vinyl acetate copolymer), was extruded for the purpose of producing a fuel tank. This parison was shaped by VWDS, PWDS and SFDR tools. The parison, which was then at a temperature of approximately 200° C., was marked on the surface by an ink based on 1% by weight of 2,5-bis(5'-tert-butyl-2'-benzoxazolyl)thiophene, UVITEX®OB, dissolved in 99% by weight of trichloroethane, SOLVETHANE® from SOLVAY. It was injected using a supply circuit with a filtration unit, at a pressure of approximately $3 \times 10^5$ Pa regulated by a gear pump, from a series of 12 BOSCH 0280.150.703 electrical injectors positioned at 12 azimuthal points. The injectors were controlled by an electronic unit sending control pulses depending on the matrix introduced by the operator and synchronizing these pulses in a sequence which is activated and stopped by the program integrated therein.

444 marks were affixed, which indicated, in particular, the effects of the parison-shaping tools. The applied marks had a size of 6 to 8 mm before blow moulding.

This marking device operated without blockage of the injectors, or purge of the system, continuously for 10 days, and likewise after a stoppage lasting three weeks.

After marking, the parison was preblown and then blown into a mould, and the moulded article, a tank having an internal volume of 80 liters, was extracted from the mould.

A unit for illuminating the tank at 3750–3850 U wavelength allowed the marking on the tank produced to be seen.

The actual position of the marking was checked automatically. This actual position was then compared with a reference position digitized and recorded in the controller. The differences were noted and changes in control values were transmitted to certain parison extrusion and shaping parameters. These control-value changes were also recorded as new parameters in the controller.

What is claimed is:

1. A process for marking a thermoplastic article by extrusion of a parison and blow molding of the parison, in which the extruded parison is marked before blow molding by at least one jet of an ink comprising 2,5-bis(5'tert-butyl-2'-benzoxazolyl)thiophene which crystallizes in acicular form during drying.

2. The process according to claim 1, in which the ink is flourescent.

3. The process according to claim 1, wherein the ink is employed in solution with a chorine-based solvent.

4. The process according to claim 1, further comprising marking the extruded parison at several separate positions.

5. The process according to claim 1, further comprising shaping the extruded parison at at least one point before marking at the at least one point.

6. The process according to claim 1, in which the article is a fuel tank.

7. The process according to claim 1, in which the parison has a non-constant thickness.

8. The process according to claim 1, in which the extruded parison is, at least with regard to the marking surface, based on polyolefin.

9. Procedure for checking the production of thermoplastic articles by extrusion-blow moulding, comprising a marking process according to any one of the preceding claims, a step of checking the actual position of the marking on the article produced, a comparison of this actual position with a predefined reference posi-tion and, consequently, a modification of certain operating parameters for the following production cycles.

* * * * *